US008966940B2

(12) United States Patent
Kumada et al.

(10) Patent No.: US 8,966,940 B2
(45) Date of Patent: Mar. 3, 2015

(54) PROCESS FOR PRODUCING GLASS BAR (75) Inventors: Tetsuya Kumada, Tokyo (JP); Yasuhiro Naka, Tokyo (JP); Toshihiro Nakamura, Tokyo (JP); Toshiaki Tateishi, Tokyo (JP)

(73) Assignee: The Fukukawa Electric Co., Ltd., Tokyo (JP)

( * ) Notice: Subject to any disclaimer, the term of this patent is extended or adjusted under 35 U.S.C. 154(b) by 711 days.

(21) Appl. No.: 11/911,166

(22) PCT Filed: Nov. 1, 2006

(86) PCT No.: PCT/JP2006/321883
§ 371 (c)(1),
(2), (4) Date: Oct. 10, 2007

(87) PCT Pub. No.: WO2007/052708
PCT Pub. Date: May 10, 2007

(65) Prior Publication Data
US 2008/0216515 A1    Sep. 11, 2008

(30) Foreign Application Priority Data

Nov. 1, 2005  (JP) ................................. 2005-318085

(51) Int. Cl.
*C03B 23/04*       (2006.01)
*C03B 37/05*       (2006.01)
(Continued)

(52) U.S. Cl.
CPC ............. *C03B 23/047* (2013.01); *C03B 23/037*
(2013.01); *B65G 2201/0294* (2013.01)
USPC .............................. 65/94; 65/93; 65/95; 65/92

(58) Field of Classification Search
CPC .......... C03B 23/37; C03B 23/47; C03B 37/05
See application file for complete search history.

(56) References Cited

U.S. PATENT DOCUMENTS 3,582,305 A  *  6/1971  Kobylak et al. ................. 65/106
3,635,687 A  *  1/1972  Dunlap et al. ................... 65/106
(Continued)

FOREIGN PATENT DOCUMENTS

JP       05116974     *  3/1991   ............ C03B 23/037
JP       5 116974        5/1993
(Continued)

OTHER PUBLICATIONS

"JP 05-116974" Machine translation as provided by AIPN Japan Patent office at http://dossier1.ipdl.inpit.go.jp/AIPN/odse_top_fwi.ipdl?N0000=7401 on Jan. 14, 2010.*
(Continued)

*Primary Examiner* — Jodi C Franklin
(74) *Attorney, Agent, or Firm* — Oblon, McClelland, Maier & Neustadt, L.L.P.

(57) ABSTRACT

In a heating drawing, a base material glass plate is heated and softened in a heating furnace, and drawn to a desired thickness to form a glass strip. In the heating drawing, the base material glass plate is heated so that the base material glass plate has a U-shaped temperature distribution in a width direction. Such process can be realized through heating by a heating element which has a non-heating portion at a position opposite to a central portion of the base material glass plate in the width direction and a heating portion on both sides of the non-heating portion. Thus provided is a method of manufacturing a glass strip, the method includes heating and softening the base material glass plate, and drawing the base material glass plate to a desirable thickness to form a glass strip, and is capable of manufacturing a thin, rod-like glass strip with an excellent flatness.

2 Claims, 10 Drawing Sheets

(51) Int. Cl.
*C03B 23/047* (2006.01)
*C03B 23/037* (2006.01)

(56) References Cited

U.S. PATENT DOCUMENTS

| | | | |
|---|---|---|---|
| 4,486,213 A * | 12/1984 | Lentz et al. | 65/30.11 |
| 4,885,020 A * | 12/1989 | Nishino et al. | 65/404 |
| 6,167,727 B1 * | 1/2001 | Tajima et al. | 65/30.1 |
| 6,385,998 B1 * | 5/2002 | Mizuno | 65/105 |
| 2006/0021385 A1 * | 2/2006 | Cimo et al. | 65/36 |
| 2006/0179882 A1 * | 8/2006 | Aoki et al. | 65/32.3 |
| 2006/0179891 A1 * | 8/2006 | Ishikawa | 65/435 |
| 2007/0271957 A1 * | 11/2007 | Nakamura et al. | 65/29.14 |
| 2008/0216515 A1 * | 9/2008 | Kumada et al. | 65/64 |

FOREIGN PATENT DOCUMENTS

| | | |
|---|---|---|
| JP | 8 183627 | 7/1996 |
| JP | 8 183628 | 7/1996 |
| JP | 11 199255 | 7/1999 |
| JP | 2005-505482 A | 2/2005 |
| JP | 2006-221166 A | 8/2006 |
| WO | WO 03/029156 A1 | 4/2003 |

OTHER PUBLICATIONS

"JP 05-116974" provided by United States Patent and Trademark Office, Translated by: Schreiber Translations, Inc. date provided: Jan. 2010.*

JP05116974 translation, Tooru Michimata, Method and Apparatus for Manufacturing Thin Glass Sheet. United States Patent and Trademark Office Washington, D.C. January 2010, Translated by: Schreiber Translations, Inc.*

U.S. Appl. No. 12/336,573, filed Dec. 17, 2008, Tateishi, et al.
U.S. Appl. No. 12/275,576, filed Nov. 21, 2008, Orita, et al.
U.S. Appl. No. 13/452,428, filed Apr. 20, 2012, Nakamura, et al.
Office Action issued Jun. 11, 2013 in Japanese Patent Application No. 2011-198816 with English language translation.

* cited by examiner

| | BASE MATERIAL GLASS PLATE | HEATER TEMPERATURE [°C] | | | TEMPERATURE DISTRIBUTION OF BASE MATERIAL GLASS PLATE [°C] | | | VISCOSITY OF BASE MATERIAL GLASS PLATE (POISE) | | VISCOSITY RATIO |
|---|---|---|---|---|---|---|---|---|---|---|
| | MATERIAL | SIDES | CENTER | TEMPERATURE DIFFERENCE | SIDES | CENTER | TEMPERATURE DIFFERENCE | SIDES | CENTER | |
| EXAMPLE 1 | TEMPAX | 1010 | 900 | 110 | 945 | 915 | 30 | 7.9×10^5 | 2.7×10^6 | 3.4 |
| COMPARATIVE EXAMPLE 1 | TEMPAX | 1000 | 1000 | 0 | 980 | 985 | −5 | 1.9×10^5 | 1.5×10^5 | 0.8 |
| EXAMPLE 2 | TEMPAX | 1055 | NA | — | 980 | 920 | 60 | 1.9×10^5 | 2.2×10^6 | 11.6 |
| EXAMPLE 3 | TEMPAX | 1055 | NA | — | 980 | 900 | 80 | 1.9×10^5 | 5.0×10^6 | 26.3 |
| EXAMPLE 4 | QUARTZ | 2020 | 1780 | 240 | 1950 | 1790 | 160 | 7.9×10^5 | 2.7×10^6 | 3.4 |
| EXAMPLE 5 | TEMPAX | 1010 | 900 | 110 | 945 | 915 | 30 | 7.9×10^5 | 2.7×10^6 | 3.4 |

| GLASS STRIP | | | | |
|---|---|---|---|---|
| WIDTH [mm] | THICKNESS [mm] | ASPECT RATIO | FLATNESS [µm] | |
| 25 | 0.38 | 66 | 5 | |
| 25 | 0.38 | 66 | 40 | |
| 25 | 0.38 | 66 | 3 | |
| 25 | 0.38 | 66 | 10 | |
| 25 | 0.38 | 66 | 2 | |
| 25 | 0.38 | 66 | 5 | |

FIG.10

| | BASE MATERIAL GLASS PLATE | | | | HEATER | | | MENISCUS | |
|---|---|---|---|---|---|---|---|---|---|
| | WIDTH [mm] | THICKNESS [mm] | LENGTH [mm] | ASPECT RATIO | LENGTH [mm] | HEAT ZONE LENGTH [mm] | HEAT ZONE LENGTH/BASE MATERIAL WIDTH | LENGTH [mm] | MENISCUS LENGTH/BASE MATERIAL WIDTH |
| EXAMPLE 6 | 328 | 5 | 1.5 | 66 | 1280 | 1170 | 3.6 | 395 | 1.2 |
| COMPARATIVE EXAMPLE 2 | 328 | 5 | 1.5 | 66 | 620 | 600 | 1.8 | 200 | 0.61 |
| EXAMPLE 7 | 780 | 7 | 2 | 111 | 1600 | 1460 | 1.9 | 530 | 0.68 |
| EXAMPLE 8 | 328 | 5 | 1.5 | 66 | 1600 | 1460 | 4.5 | 490 | 1.5 |

| | GLASS STRIP | | | |
|---|---|---|---|---|
| | WIDTH [mm] | THICKNESS [mm] | ASPECT RATIO | FLATNESS [μm] |
| | 25 | 0.38 | 66 | 5 |
| | 25 | 0.38 | 66 | 40 |
| | 70 | 0.64 | 109 | 5 |
| | 25 | 0.38 | 66 | 5 |

FIG.11

| | BASE MATERIAL GLASS PLATE | | | HEATER TEMPERATURE [°C] | | | TEMPERATURE DISTRIBUTION OF BASE MATERIAL GLASS PLATE [°C] | | | HEATER | | |
|---|---|---|---|---|---|---|---|---|---|---|---|---|
| | THICKNESS [mm] | WIDTH [mm] | LENGTH [mm] | ASPECT RATIO | SIDES | CENTER | TEMPERATURE DIFFERENCE | SIDES | CENTER | TEMPERATURE DIFFERENCE | LENGTH [mm] | HEAT ZONE LENGTH [mm] | HEAT ZONE LENGTH/BASE MATERIAL WIDTH |
| EXAMPLE 9 | 328 | 5 | 1.5 | 66 | 1055 | 875 | 180 | 980 | 920 | 60 | 950 | 870 | 2.7 |
| EXAMPLE 10 | 328 | 5 | 1.5 | 66 | 1055 | 875 | 180 | 980 | 920 | 60 | 620 | 600 | 1.8 |
| EXAMPLE 11 | 328 | 5 | 1.5 | 66 | 1055 | NA | — | 980 | 920 | 60 | 500 | 870 | 2.7 |

| | VISCOSITY OF BASE MATERIAL GLASS PLATE (POISE) | | | MENISCUS | | GLASS STRIP | | | | |
|---|---|---|---|---|---|---|---|---|---|---|
| | SIDES | CENTER | VISCOSITY RATIO | LENGTH [mm] | MENISCUS LENGTH/BASE MATERIAL WIDTH | WIDTH [mm] | THICKNESS [mm] | ASPECT RATIO | FLATNESS [μm] |
| | $1.9 \times 10^5$ | $2.2 \times 10^6$ | 11.6 | 288 | 0.88 | 25 | 0.38 | 66 | 1 |
| | $1.9 \times 10^5$ | $2.2 \times 10^6$ | 11.6 | 200 | 0.61 | 25 | 0.38 | 66 | 3 |
| | $1.9 \times 10^5$ | $2.2 \times 10^6$ | 11.6 | 288 | 0.88 | 25 | 0.38 | 66 | 1 | ness to thereby form a glass strip, capable of manufacturing a thin, rod-like glass strip with an excellent flatness.

PROCESS FOR PRODUCING GLASS BAR

TECHNICAL FIELD

The present invention relates to a method of manufacturing a thin, rod-like glass strip through heating drawing of a thick, plate-like base material glass plate.

BACKGROUND ART

Conventionally, improvements in flatness and surface roughness are very important for a glass plate employed for substrates of semiconductor devices, spacers for field-effect flat panel displays, or substrates of magnetic disks. However, a float process or a casting process currently typically used as a method of manufacturing a glass plate produces glass plates with low flatness when used to manufacture thin glass plates. Therefore, the glass plate has to be finished to an appropriate flatness for the above use through grinding and polishing of a significant amount of a surface thereof. As a result, the glass plate after the grinding has an extremely unfavorable surface roughness.

To solve the problem as described above, the ground glass plate typically is subjected to the polishing twice, so that the surface roughness is 0.5 nm after the first polishing, and approximately 0.1 nm after the second polishing. It is expected that a third polishing will be required in addition to the above, since there will be a demand for a product with higher precision in the next generation. Therefore, an endeavor to improve the flatness of the glass plate only through the grinding and polishing will end up in more time and work for grinding and polishing, which eventually leads to a higher equipment cost.

In view of the above, a method is devised to manufacture a thin glass plate of a desirable thickness using a base material glass plate with a predetermined thickness and an improved surface roughness and by heating the base material glass plate to soften the same and drawing the softened glass plate (see patent Document 1).

Further, in connection with the above method of manufacturing a glass plate, a technique for eliminating local unevenness of the thickness of a glass plate is disclosed, according to which, plural coolers are arranged along a width direction of the glass plate, and power of a heater placed at a position corresponding to an uneven portion is adjusted, or the glass plate is cooled partially in the width direction (see Patent Document 2).

Patent Document 1: Japanese Patent Application Laid-Open No. H11-199255
Patent Document 2: Japanese Patent Application Laid-Open No. H8-183627

DISCLOSURE OF INVENTION

Problem to be Solved by the Invention

However, when a thin glass strip of 0.7 mm or less in thickness is to be formed through heating, softening, and drawing of the base material glass plate, for example, it is difficult to make a glass strip with an even thickness in width direction, and the conventional glass strip after the heating drawing has an unfavorable flatness.

In view of the above, an object of the present invention is to provide a method of manufacturing a glass strip by heating and softening a base material glass plate in a heating furnace and drawing the softened base glass plate to a desirable thickness to thereby form a glass strip, capable of manufacturing a thin, rod-like glass strip with an excellent flatness.

Means for Solving Problem

To solve the problems as described above and to achieve an object, a method of manufacturing a glass strip according to the present invention includes heating drawing for heating and softening a base material glass plate in a heating furnace, and drawing the base material glass plate to a desirable thickness to form a glass strip, wherein the base material glass plate is heated in the heating drawing so that the base material glass plate has a U-shaped temperature distribution in a width direction.

Further, in the method of manufacturing a glass strip according to the present invention, the base material glass plate may be heated in the heating drawing so that a viscosity ratio of a central portion to a side portion of the base material glass plate in the width direction is larger than one and not larger than 20.

Still further, in the method of manufacturing a glass strip according to the present invention, the base material glass plate may be heated in the heating drawing by a heating element which has a non-heating portion at a position opposite to a central portion of the base material glass plate in the width direction and a heating portion on both sides of the non-heating portion.

Still further, a method of manufacturing a glass strip according to the present invention includes heating drawing for heating and softening a base material glass plate in a heating furnace, drawing the base material glass plate to a desirable thickness to form a glass strip, wherein the base material glass plate is heated in the heating drawing so that a length of the base material glass plate from a position where melting starts to a position of an inflection point formed at a time of drawing on a contour of the base material glass plate is equal to or longer than two-thirds a width of the base material glass plate.

Still further, in the method of manufacturing a glass strip according to the present invention, the base material glass plate may be heated in the heating drawing so that the length of the base material glass plate from the position where melting starts to the position of the inflection point formed at the time of drawing on the contour of the base material glass plate is equal to or shorter than 1.5 times the width of the base material glass plate.

Still further, in the method of manufacturing a glass strip according to the present invention, the base material glass plate may be heated in the heating drawing so that the base material glass plate has a U-shaped temperature distribution in the width direction.

Still further, in the method of manufacturing a glass strip according to the present invention, the base material glass plate may be heated in the heating drawing so that a viscosity ratio of a central portion to a side portion of the base material glass plate in the width direction is larger than one and not larger than 20.

Still further, in the method of manufacturing a glass strip according to the present invention, the base material glass plate may be heated in the heating drawing by a heating element which has a non-heating portion at a position opposite to a central portion of the base material glass plate in the width direction and a heating portion on both sides of the non-heating portion.

Still further, in the method of manufacturing a glass strip according to the present invention, the base material glass plate may be heated in the heating drawing so that at least a portion of the base material glass plate from the position where melting starts to the position of the inflection point formed at the time of the drawing on the contour of the base material glass plate has a U-shaped temperature distribution in the width direction.

Still further, in the method of manufacturing a glass strip according to the present invention, the base material glass plate may be heated in the heating drawing so that at least a portion of the base material glass plate from a position where melting starts to a position of a distortion point temperature is placed in the heating furnace.

Still further, in the method of manufacturing a glass strip according to the present invention, the base material glass plate may have a thermal expansion coefficient equal to or lower than $32 \times 10^{-7}$ (1/k).

Still further, in the method of manufacturing a glass strip according to the present invention, the base material glass plate may be made of borosilicate glass or quartz glass.

Still further, in the method of manufacturing a glass strip according to the present invention, the base material glass plate may be drawn in the heating drawing so that the glass strip has a aspect ratio in cross section equal to or higher than 50.

Still further, in the method of manufacturing a glass strip according to the present invention, the base material glass plate may be drawn in the heating drawing so that the glass strip has a thickness equal to or lower than 0.7 mm.

Effect of the Invention

According to the present invention, difference in glass flow generated in a central portion and a side portion of the base material glass plate in a width direction at the time of heating drawing is compensated by heating of the base material glass plate in such a manner that the U-shaped temperature distribution is generated in the width direction and generation of difference in glass viscosity between the central portion and the side portion in the width direction of the base material glass plate. Thus, the speed of glass flow can be balanced, and the thickness of the glass strip in the width direction can be made uniform, whereby the glass strip with an excellent flatness can be manufactured.

Further, according to the present invention, the difference in the speed of glass flow between the central portion and the side portion of the base material glass plate is suppressed when the heating is performed in the heating drawing so that the length from a position where the melting of the base material glass plate starts to a position of an inflection point formed at the time of drawing on a contour of the base material glass plate is equal to or longer than two-thirds the width of the base material glass plate, whereby the thickness of the glass strip in the width direction can be made uniform, and a glass strip with an excellent flatness can be manufactured.

EXPLANATIONS OF LETTERS OR NUMERALS

1 Base material glass plate
5 Guide roll
7 Outer shape measuring device
8 Protective-film coating device
9 Tension measuring device
10, 40, 60 Heating furnace
11 Glass strip
13, 14 Feedback path
15a to 15f Heater
16 Furnace casing
17 Core tube
18 Carbon block
19 Structure
20 Base material transfer mechanism
21 Cutter
22 Meniscus length
23 Width of base material glass plate
24 Heat zone length
25 Meniscus portion
30 Pulling-out mechanism
50 Heating drawing apparatus

BEST MODE(S) FOR CARRYING OUT THE INVENTION

Exemplary embodiments of a method of manufacturing a glass strip according to the present invention will be described in detail below with reference to the accompanying drawings. The present invention is not limited by the embodiments.

First Embodiment

Figure 1:
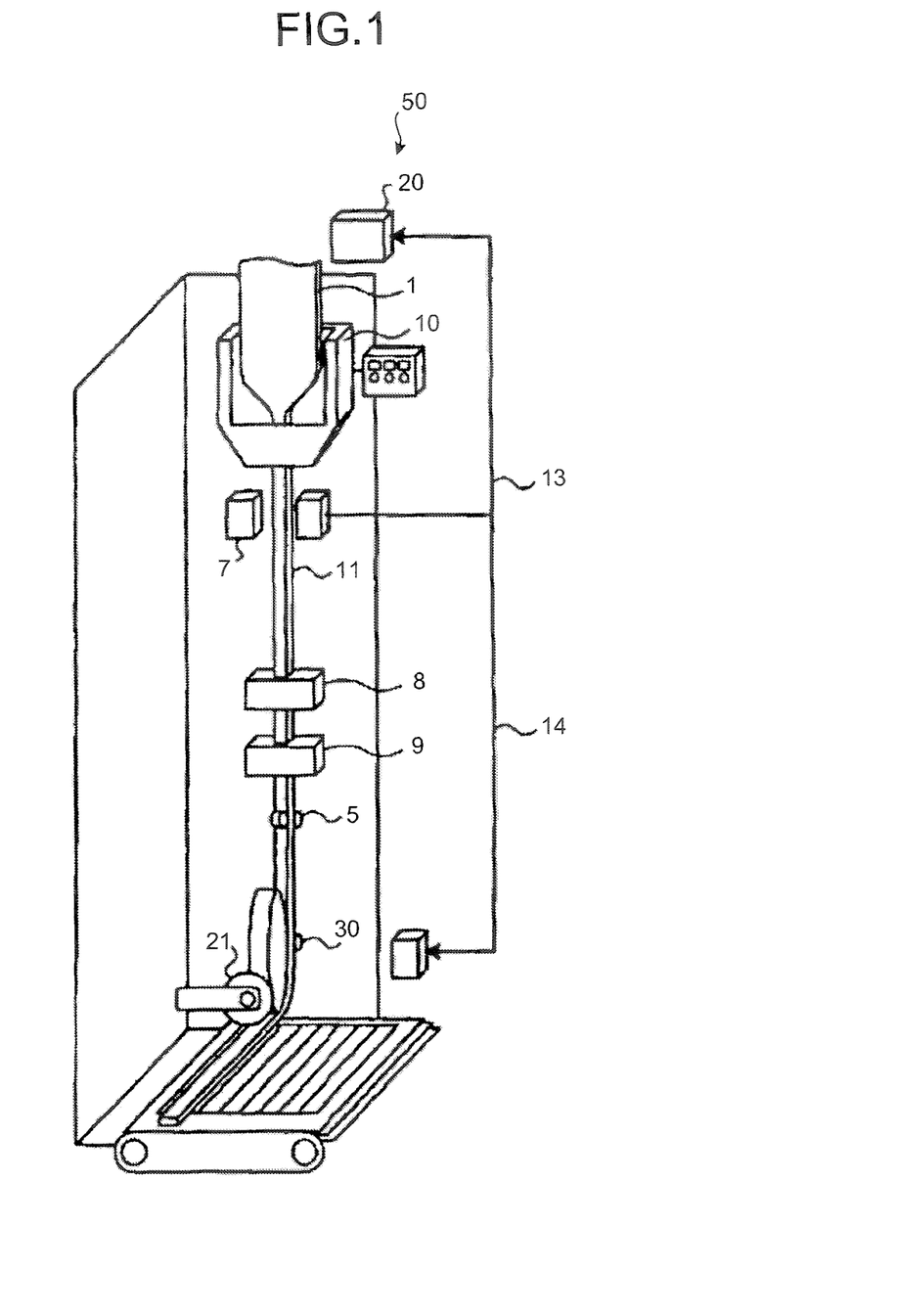
FIG. 1 is a perspective view of a heating drawing apparatus employed in a method of manufacturing a glass strip according to an embodiment of the present invention.

FIG. 1 is a perspective view of a heating drawing apparatus employed for a method of manufacturing a glass strip according to an embodiment of the present invention. A heating drawing apparatus 50 includes a heating furnace 10 which is an electric resistance furnace heating a base material glass plate 1, a base material transfer mechanism 20 which transfers the base material glass plate 1 into the heating furnace 10, and a pulling-out mechanism 30 which pulls out a glass strip 11 from the heating furnace 10. The heating furnace 10 is provided with plural heaters not shown as heating units that heat the base material glass plate 1. Further, at a lower portion of the heating furnace 10, an outer shape measuring device 7 that measures an outer shape of the glass strip 11, a protective-film coating device 8 that applies a protective film on a surface of the glass strip 11, a tension measuring device 9 that measures tension of pulling of the glass strip 11, and a guide roll 5 that prevents twisting of the glass strip 11 are provided. Further, at a lower portion of the pulling-out mechanism 30, a cutter 21 is provided for carving a groove on a surface of the glass strip and breaking the glass strip into a predetermined length. Measurement values obtained by the outer shape measuring device 7 are fed back to the base material transfer mechanism 20 through a feedback path 13. The base material transfer mechanism 20 controls a speed of base material transfer based on the feedback value. Further, the measurement values are also fed back to the pulling-out mechanism 30 through a feedback path 14. The pulling-out mechanism 30 controls a pulling-out speed based on the feedback value.

Figure 2:
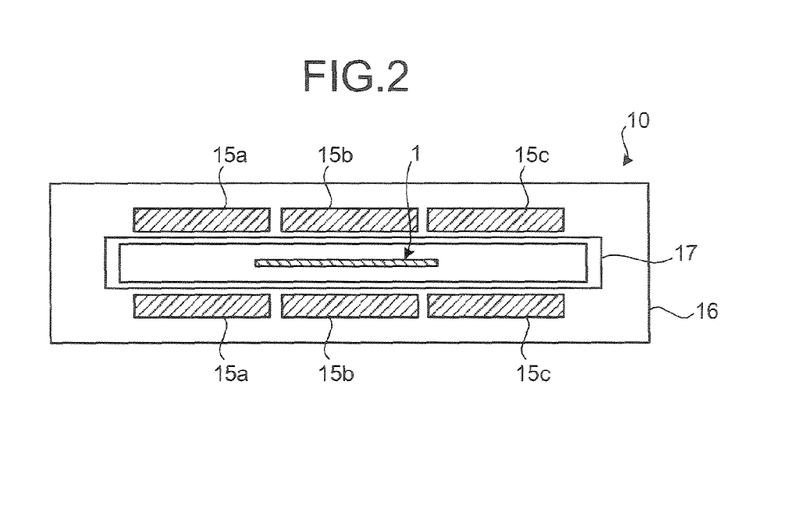
FIG. 2 is a sectional view of a heating furnace shown in FIG. 1.
Figure 3:
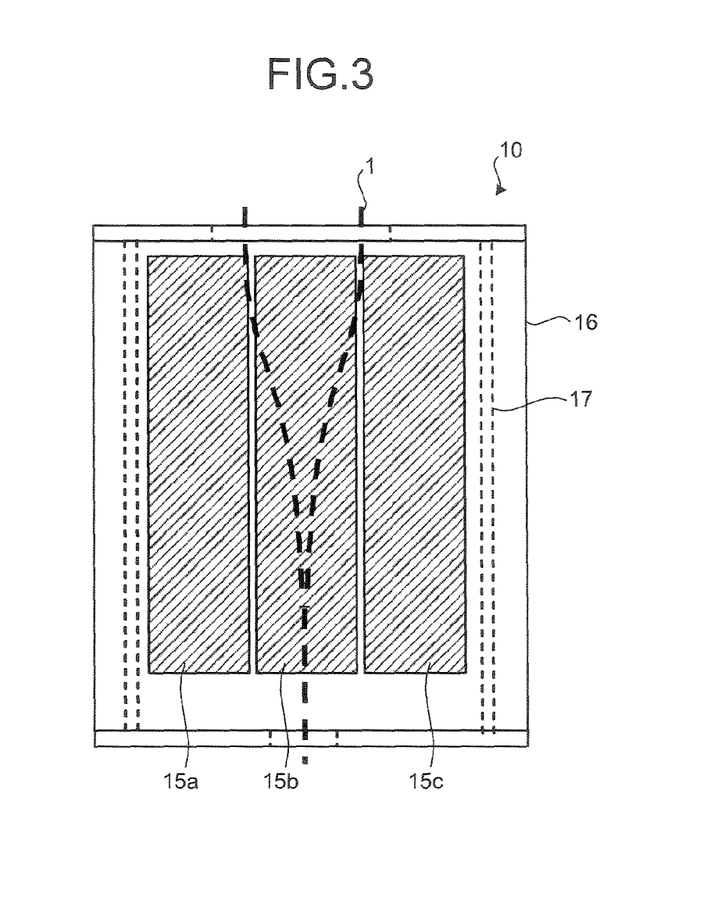
FIG. 3 is a plan view of the heating furnace shown in FIG. 1.

FIG. 2 is a sectional view of the heating furnace 10 shown in FIG. 1; and FIG. 3 is a plan view of the heating furnace 10 shown in FIG. 1. The base material glass plate 1 is arranged inside a rectangular core tube 17 in a furnace casing 16. Around the core tube 17, plural heaters 15a, 15b, and 15c are arranged. For example, a carbon resistance heating element is employed as the heater. Further, a circumference of the heater is protected by an inert gas to prevent the wasting of the heater.

The base material glass plate starts softening and melting when subjected to heating at a temperature equal to or higher than a softening point, and the width thereof contracts and the base material glass plate is drawn. At the time of drawing, an inflection point is formed on the contour of the base material glass plate, and thereafter, the glass strip having a desirable thickness and width is formed. A portion from a position where the base material glass plate starts melting to a position of the inflection point is called meniscus portion, and a length thereof is called meniscus length. In the meniscus portion, glass flows differently in a central portion and a side portion of the base material glass plate in a width direction.

In the present invention, the base material glass plate is heated in a heating drawing process in such a manner that the base material glass plate has a U-shaped temperature distribution in the width direction. Since the side portion of the base material glass plate is higher in temperature than the central portion, the viscosity of the glass becomes even lower and the speed of glass flow increases. Thus, in the meniscus portion of the base material glass plate, the difference in glass flow generated between the central portion and the side portion in the width direction is compensated by the difference in glass viscosity, and the speed of the glass flow is balanced, whereby the thickness of the glass strip in the width direction is made uniform and the glass strip with an excellent flatness can be manufactured.

Figure 4:
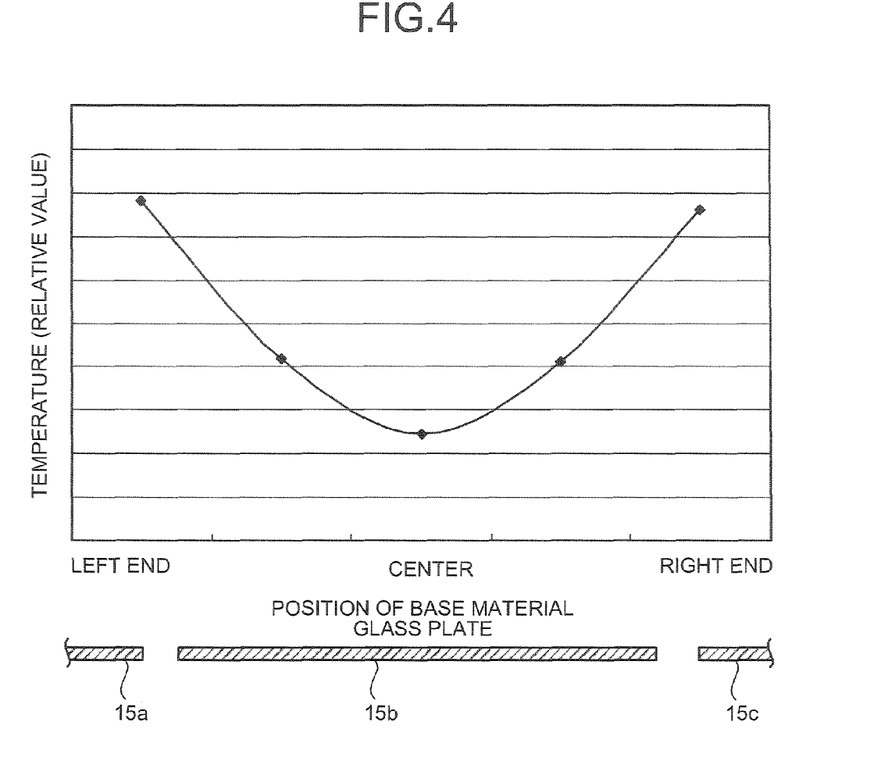
FIG. 4 is a graph of temperature distribution of a base material glass plate in a width direction shown in association with arrangement of heaters relative to the base material glass plate.

FIG. 4 is a graph of temperature distribution of the base material glass plate in the width direction in the heating furnace shown in FIG. 2 shown in association with arrangement of heaters relative to the base material glass plate. An abscissa of the graph represents temperature-measurement position of the base material glass plate, whereas an ordinate represents relative temperature of the base material glass plate at the measurement position. In a lower portion of the graph, an arrangement of the heaters is shown relative to the base material glass plate. When the heater 15b at a position opposite to the central portion of the base material glass plate is made lower in temperature than the heaters 15a and 15c to the sides thereof, the base material glass plate can be heated so as to have a U-shaped temperature distribution in the width direction as shown in the graph.

Figure 5:
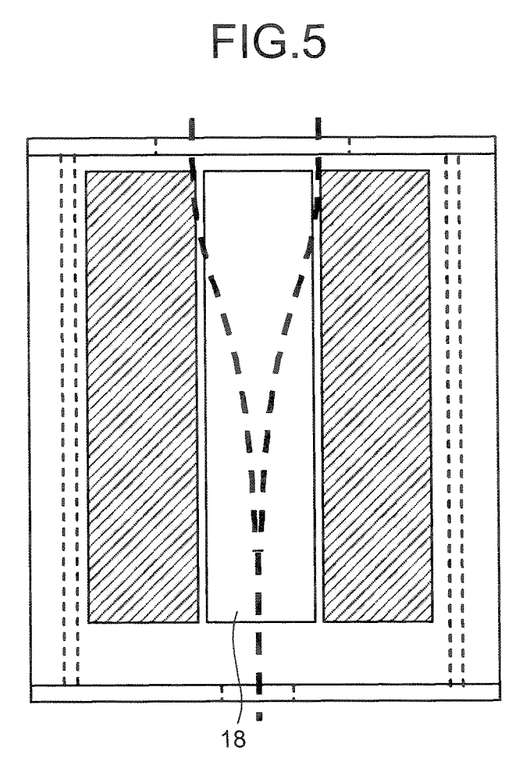
FIG. 5 is a schematic diagram of heaters where a carbon block is arranged in place of a heater in a central portion.

As described above, the U-shaped temperature distribution in the width direction of the base material glass plate can be achieved through the heating when the power of the heater 15b at the central portion shown in FIG. 2 is not turned on, or when a carbon block 18 is arranged in place of the heater 15b as shown in FIG. 5. Thus, when the heating is performed with the use of a heating element having a non-heating portion at a position opposite to the central portion of the base material glass plate in the width direction, and having heating portions at both sides of the non-heating portion, the temperature difference between the central portion and the side portion of the base material glass plate can be further increased, so as to increase the difference in glass viscosity. Further, the use of a heat-insulating material having higher heat conductivity as a heat insulator arranged outside the core tube of the furnace can also increase the temperature difference. For example, a box configured with a carbon block filled with carbon fibers can be used as the heat-insulating material. Such a heat-insulating material may have heat conductivity of 0.4 to 4 W/mk or more.

Second Embodiment

Another embodiment of the present invention will be described. The first embodiment described above realizes the manufacture of a glass strip with an excellent flatness by defining the temperature distribution of the base material glass plate in the width direction. The another embodiment realizes the manufacture of a glass strip with an excellent flatness by defining a relation between temperature distribution in the heating furnace in a drawing direction of the base material glass plate and the width of the base material glass plate.

Figure 6:
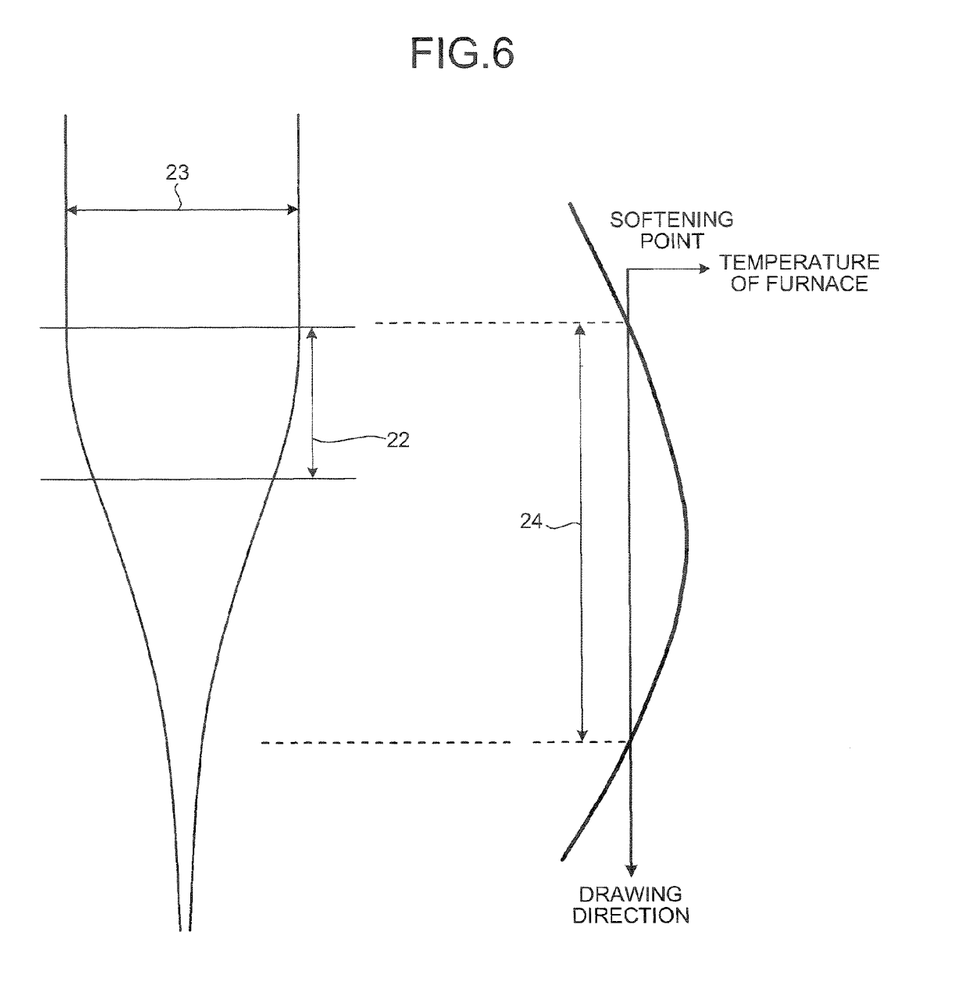
FIG. 6 is an explanatory diagram for explaining a method of manufacturing a glass strip according to another embodiment of the present invention.

FIG. 6 is an explanatory diagram for explaining a method of manufacturing a glass strip according to the another embodiment of the present invention. According to the another embodiment, heating is performed in a heating drawing process so that the length from a position where the base material glass plate starts melting to a position of an inflection point formed at the time of drawing on the contour of the base material glass plate, in other words, a meniscus length 22, is equal to or longer than two-thirds a width 23 of the base material glass plate. Then, the meniscus portion of the base material glass plate is sufficiently long, and smaller gradient is formed on the side portion when the width of the glass plate contracts, whereby the difference in speed of glass flow between the central portion and the side portion does not increase. Therefore, the thickness of the glass strip in the width direction can be made uniform, whereby the glass strip with an excellent flatness can be manufactured.

The meniscus length 22 can be adjusted appropriately through the adjustment of the heater length and the length of a heat zone in the drawing direction of the base material glass plate in the heating furnace; when the heat zone is made longer, the meniscus length 22 can be made longer, accordingly. Further, the meniscus length can be made longer when the pulling-out speed is increased. Here, "heat zone" means a portion where the temperature in the heating furnace is equal to or higher than a softening point of the used glass as shown in FIG. 6, and "heat zone length" is a length 24 of the heat zone of the base material glass plate in the drawing direction. The viscosity of the base material glass plate is minimal in a portion where the temperature is highest, and the inflection point is formed on the contour of this portion. A point where the glass is of the highest temperature is determined by a combination of the heat zone and the pulling-out speed.

Therefore, when the length and the arrangement of the heaters 15a, 15b, and 15c are appropriately adjusted, the length of a portion extending from the upper end of the heat zone to a portion of the highest temperature, and the heat zone length are adjusted, whereby the heating can be performed so that a length from the point where the base material glass plate starts melting to a position of the inflection point, which is formed at a time of the drawing, on the contour of the base material glass plate is equal to or longer than two-thirds the width of the base material glass plate. Further, in the second embodiment, the heaters 15a, 15b, and 15c may be set to the same temperature, so that the base material glass plate is heated so as to have an even temperature distribution in the width direction. Alternatively, however, when the heater 15b is set to a lower temperature than the temperature of the heaters 15a and 15c, or when the heater 15bs is not powered, or when a carbon block is installed instead of the heater 15b, so that the base material glass plate is heated so as to have a U-shaped temperature distribution in the width direction, the thickness of the glass strip in the width direction can be made even more uniform, whereby a glass strip with an even more excellent flatness can be manufactured.

Third Embodiment

Still another embodiment of the present invention will be described. The first embodiment described above achieves the manufacture of a glass strip with an excellent flatness by defining the temperature distribution of the base material glass plate in the width direction. The second embodiment achieves the manufacture of a glass strip with an excellent flatness by defining the relation between the temperature distribution in the heating furnace in the drawing direction of the base material glass plate and the width of the base material glass plate. The third embodiment achieves manufacture of a glass strip with an even more excellent flatness with a high heating efficiency by combining the above two and additionally defining a position where the temperature distribution in the width direction is defined.

Figure 7:
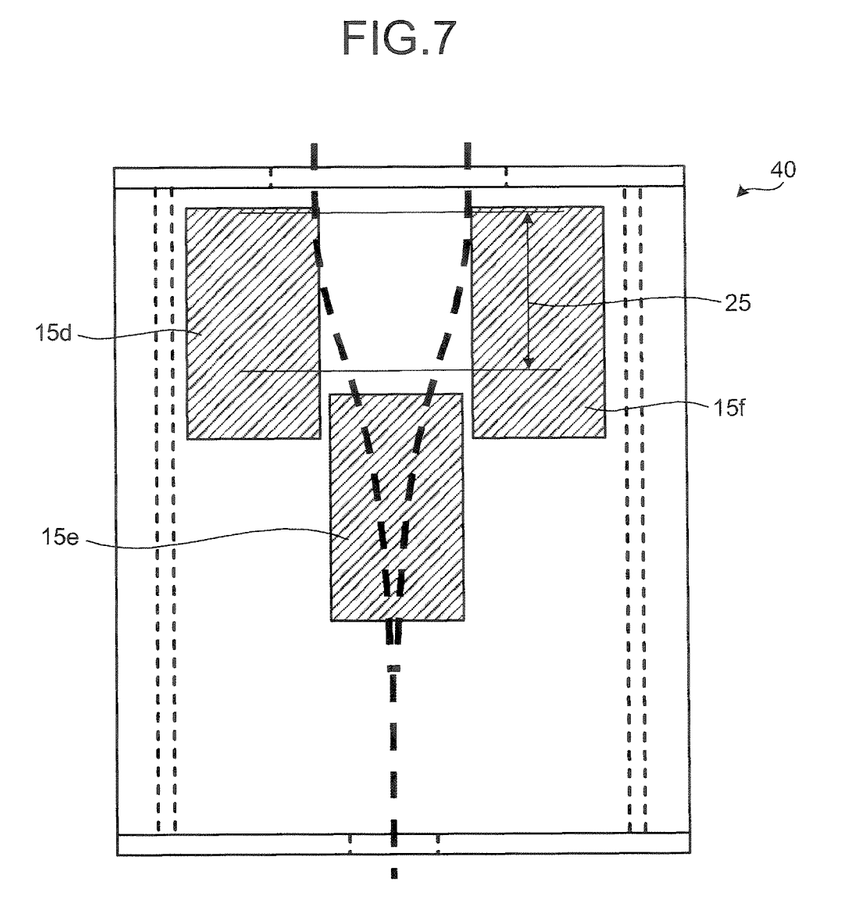
FIG. 7 is a plan view of a heating furnace employed in a method of manufacturing a glass strip according to still another embodiment of the present invention.

FIG. 7 is a plan view of a heating furnace employed in a method of manufacturing a glass strip according to the still another embodiment of the present invention. A heating furnace 40 having heaters 15d, 15e, and 15f with relatively short heater length is employed, and a base material glass plate is heated by the heaters 15d and 15f so that at least a portion extending from a position where the base material glass plate starts melting to a position of an inflection point formed at a time of the drawing on the contour of the base material glass plate, in other words, a meniscus portion 25, has a U-shaped temperature distribution in the width direction of the base material glass plate. Further, with the arrangement of the heater 15e with relatively short heater length at a position lower than the portion 25, the base material glass plate is heated so that the length from the position where the base material glass plate starts melting to the position of the inflection point formed at the time of the drawing on the contour of the base material glass plate is equal to or longer than two-thirds the width of the base material glass plate. Then, even if the heater length of each heater is short, the thickness of the glass strip in the width direction can be made even more uniform, whereby a glass strip with an even more excellent flatness can be manufactured.

The position of the inflection point of the contour of the base material glass plate is a point where the viscosity of the glass is minimum in the drawing direction, and the glass is cooled and annealed in a portion below this point. Therefore, at a portion below the inflection point, even if the length of the heaters on two sides is made longer so as to form the U-shaped temperature distribution in the width direction, there is relatively little influence on the flatness of the resulting glass strip. In brief, an important point is that the portion from the position where the base material glass plate starts melting to the position of the inflection point on the contour is heated so as to have the U-shaped temperature distribution in the width direction, and the heaters with necessary length for the purpose are used on two sides. On the other hand, the central portion of the base material glass plate, i.e., an upper portion of the heat zone can be heated sufficiently by the heaters on two sides. Therefore, the heater at the center does not need to be long enough to reach the upper portion. As far as the heater is arranged at a lower position than the heaters on two sides and at such a position that the highest temperature portion of the heat zone can be formed at a lower position, even if the heater length of the used heater is relatively short, the heating can be performed so that the length from the position where the base material glass plate starts melting to the position of the inflection point formed at the time of the drawing on the contour of the base material glass plate is equal to or longer than two-thirds the width of the base material glass plate.

Fourth Embodiment

Still another embodiment of the present invention will be described. The first to the third embodiments described above achieve the manufacture of a glass strip with an excellent flatness by making the thickness of the glass strip uniform in the width direction. The fourth embodiment can be combined with any of the above embodiments, and relates to a method of manufacturing a glass strip while preventing a distortion of the glass strip.

Figure 8:
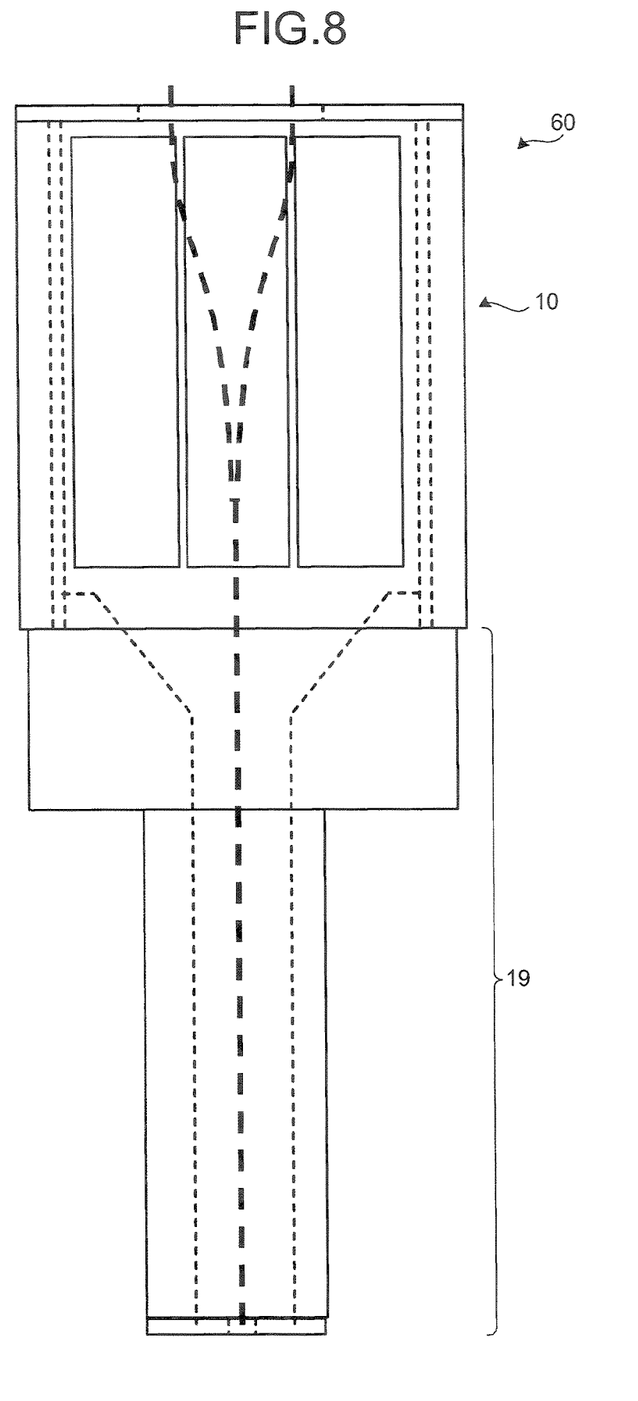
FIG. 8 is a plan view of a heating furnace employed for a method of manufacturing a glass strip according to still another embodiment of the present invention.

FIG. 8 is a plan view of a heating furnace used in the method of manufacturing a glass strip according to the still another embodiment of the present invention. A heating furnace 60 in which an extended structure 19 surrounds a lower portion of the heating furnace 10 is employed, so that a portion of the base material glass plate extending from a position where melting starts to a position of a distortion point temperature is placed in the heating furnace during heating. With such an arrangement, the glass strip is not cooled suddenly to a temperature equal to or lower than the distortion point temperature at a time the glass strip is pulled out from the heating furnace to an atmosphere, whereby the distortion does not occur. In addition, it is possible to increase the pulling-out speed of the glass strip. Preferably, a portion of the base material glass plate extending from the position where the melting starts to a position where the temperature is lower than the distortion point temperature of the base material glass plate by 50° C. or, more preferably 100° C., is placed in the heating furnace during the heating, since such an arrangement securely prevents the distortion.

Examples of the method of manufacturing a glass strip according to the present invention will be described in detail below. The present invention, however, is not limited by the examples.

Examples 1 to 5 & Comparative Example 1

As an example of the present invention, a base material glass plate of 328 mm in width, 5 mm in thickness, and approximately 1.5 m in length is prepared from borosilicate glass (TEMPAX Float® manufactured by Schott AG) or quartz. The prepared base material glass plate is subjected to heating drawing, and a glass strip is manufactured. As a heating furnace, one with three heaters arranged on two sides of the base material glass plate as shown in FIG. 2, or one with an extended structure surrounding a lower portion of the furnace as shown in FIG. 8 is employed. The employed heater is 620 mm in length and 256 mm in width. The heaters are arranged so that the distance between center lines of the heaters is 277 mm. Drawing conditions are: pulling-out speed is 4 m/min, width after drawing is 25 mm, and thickness is 0.38 mm. Aspect ratio in cross section is 66. Here, "aspect ratio in cross section" is a ratio of width to thickness in a cross section of the glass plate. When the aspect ratio in cross section of the glass strip is equal to or more than 50, or when the thickness is equal to or lower than 0.7 mm, or both, an effect of the present invention, i.e., an improvement of the flatness becomes even more prominent.

Figure 9:
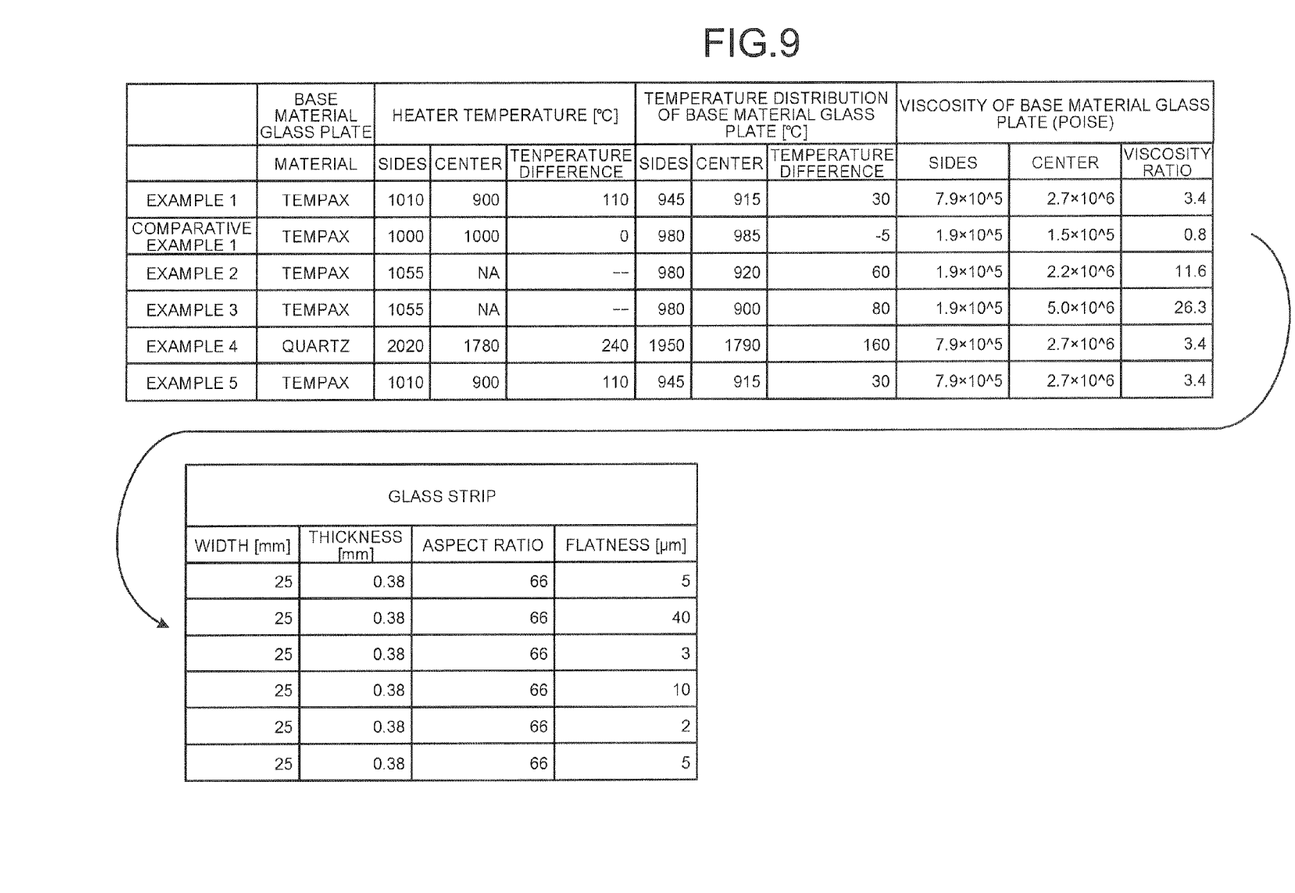
FIG. 9 is a table of examples 1 to 5 and a comparative example 1.

Examples 1 to 5 and a comparative example 1 shown in FIG. 9 will be described below. In the example 1, the temperature of the central heater is set to 900° C. and the temperature of the side heaters each is set to 1010° C. in the heating furnace of FIG. 2. The temperature of the base material glass plate is 915° C. in the central portion and 945° C. in two side portions, thereby making a U-shaped temperature distribution with temperature difference of 30° C. Though a glass strip manufactured under the above conditions has a concave-lens-like section, the flatness is 5 μm against plate width of 20 mm, showing a favorable level. Here, "flatness" means a height difference in a vertical direction between a highest point and a lowest point at two points distanced from each other by an arbitrary unit length on a substrate surface, when a glass strip is cut off as a substrate having a necessary area and placed on a horizontal plane. In the above, the unit length is the plate width, i.e., 20 mm.

On the other hand, in the comparative example 1, the temperature of the central heater and the side heaters are set equally to 1000° C. in the heating furnace of FIG. 2. The temperature of the base material glass plate is 985° C. in the central portion, and 980° C. in the side portions, showing little temperature difference. A glass strip manufactured under such conditions shows a prominent concave-lens shape in cross section and has a large value of flatness of 40 μm against the plate width of 20 mm.

In the example 2, in the heating furnace of FIG. 2, the central heater is not powered, and a box configured with a carbon block filled with carbon fibers is used outside the core tube as a heat insulating member for the furnace. Heat conductivity of the heat insulating member is 0.4 to 4 W/mk. Thus, the temperature difference between the central portion and the side portion of the base material glass plate in the width direction is set to 60° which is higher than that in the example 1. Here, viscosity ratio of the central portion to the side portion of the base material glass plate in the width direction is 11.6. A glass strip manufactured under such conditions has a favorable flatness of 3 μm against the plate width of 20 mm.

On the other hand, in the example 3, the central heater is not powered, similarly to the example 2, and a member with heat conductivity equal to or higher than 4 W/mk is employed as a heat insulating member. The temperature difference between the central portion and the side portion of the base material glass plate in the width direction is set to 80° C. which is higher than that in the example 1 or 2. The viscosity ratio of the central portion to the side portion of the base material glass plate in the width direction is 26.3. A glass strip manufactured under such conditions has a flatness of 10 μm against the plate width of 20 mm, which is an improvement over the comparative example 1, though the value is larger than that in the example 1 or 2. Further, the sectional area of the glass strip is of an upward-convex shape. When the temperature of the central portion of the base material glass plate is lowered in excess, the viscosity shows an excessive increase, whereby the flatness is deteriorated adversely. Based on the results, it is found that the heating is preferably performed so that the viscosity ratio of the central portion to the side portion of the base material glass plate in the width direction is larger than 1 and not larger than 20.

The example 4 employs a base material glass plate of quartz. In the heating furnace of FIG. 2, the temperature of the central heater is set to 1780° C., and the temperature of the side heaters each is set to 2020° C. The temperature of the base material glass plate is 1790° C. in the central portion, and is 1950° C. in the side portion, thereby showing a U-shaped temperature distribution with the temperature difference of 160° C. A glass strip manufactured under such conditions has a favorable flatness of 2 μm against the plate width of 20 mm. As can be seen from the above, when the base material glass plate is made of a material such as TEMPAX Float® or quartz having a thermal expansion coefficient of $32 \times 10^{-7}$ (1/k) or less, even when the process is likely to cause temperature difference between the front side and the back side of the glass plate as when the rectangular furnace is employed, there is little difference in stretch amount of the glass plate at the front side and the back side, whereby the glass plate is less likely to be distorted due to thermal expansion, and a more flat glass strip can be manufactured. Further, since sudden heating or cooling does not cause cracking, the glass strip can be pulled out at higher speed.

In the example 5, an extended structure surrounds the lower portion of the furnace as shown in FIG. 8. The pulling-out speed is 7 m/min. The furnace is surrounded by the structure up to a portion 1.5 m below the lower end of the heater, and therefore, the drawn glass strip can be gradually cooled before pulled out from the heating furnace and cooled suddenly by the atmosphere. Thus, the glass strip can be gradually cooled down to 510° C. which is a distortion point temperature of TEMPAX Float®. When the structure made as an extension of the lower portion of the furnace is employed, no distortion occurs in the glass strip even when the pulling-out speed is increased. In addition, the glass strip has a favorable flatness of 5 μm against the plate width of 20 mm.

Examples 6 to 8 & Comparative Example 2

As an example of the present invention, a base material glass plate of 328 mm in width, 5 mm in thickness, and approximately 1.5 m in length is prepared from TEMPAX Float® whose softening point is 820° C. The prepared base material glass plate is subjected to heating drawing, and a glass strip is manufactured. As a heating furnace, one with three heaters arranged on two sides of the base material glass plate as shown in FIG. 2 is employed. The temperature of each heater is set to 1000° C. Here, the temperature of the base material glass plate is 985° C. in the central portion, and 980° in the side portions, with little temperature difference. As a drawing condition, the pulling-out speed is set to 7 m/min.

Figure 10:
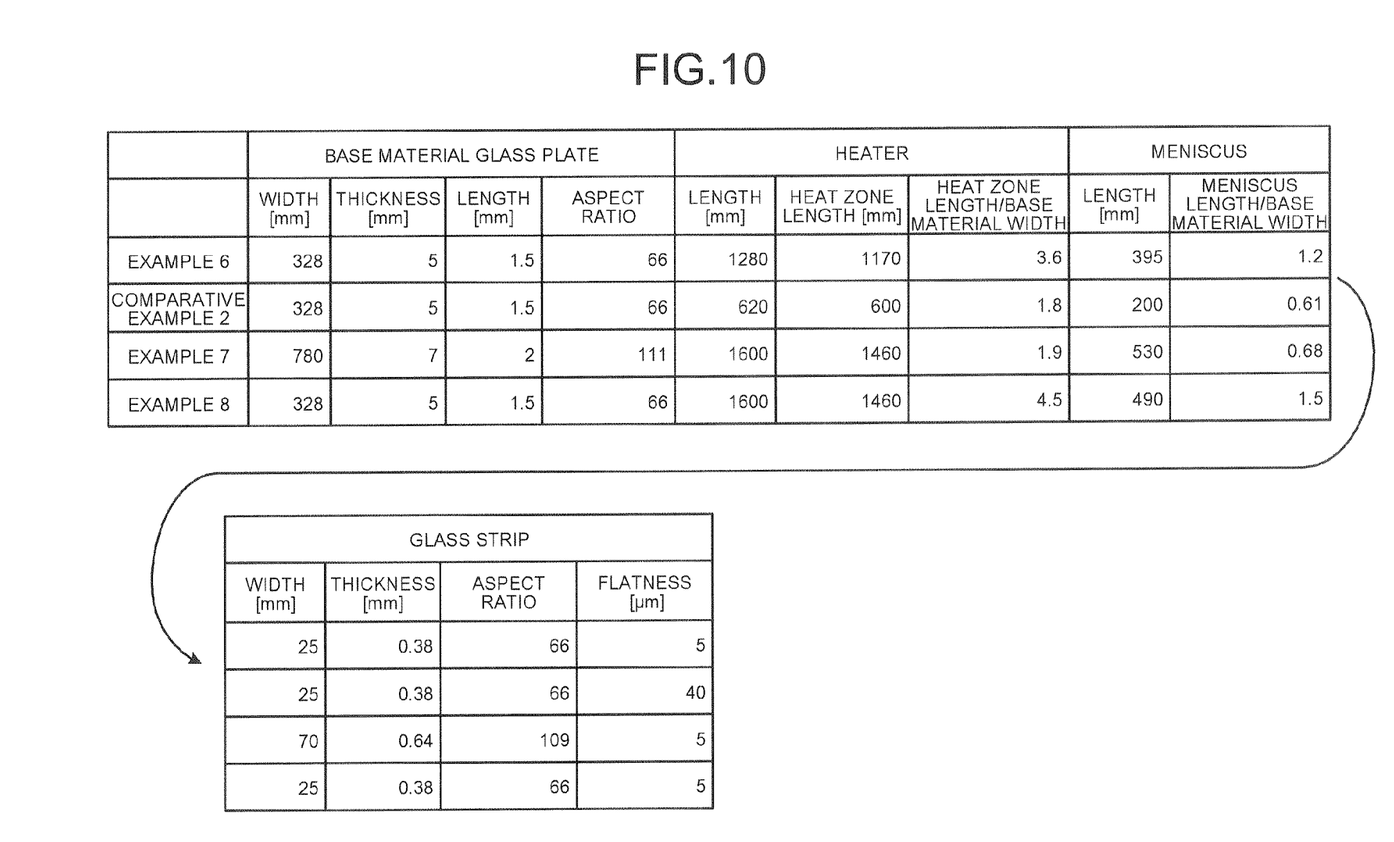
FIG. 10 is a table of examples 6 to 8 and a comparative example 2.

Examples 6 to 8 and a comparative example 2 shown in FIG. 10 will be described. The example 6 adjusts the heat zone length by setting an appropriate heater length, and heats the base material glass plate so that the meniscus length is 1.2 times the width of the base material glass plate (base material width). A glass strip manufactured under such conditions shows a favorable flatness of 5 μm against the plate width of 20 mm.

On the other hand, the comparative example 2 heats the base material glass plate so that the meniscus length is 0.61 time the base material width. A glass strip manufactured under such conditions has a large value of flatness of 40 μm against the plate width of 20 mm.

The example 7 employs a wide base material glass plate and heats the base material glass plate so that the meniscus length is 0.68 time the base material width. A glass strip manufactured under such conditions shows a favorable flatness of 5 μm against the plate width of 60 mm. In other words, it is found that regardless of the width of the base material glass plate, a glass strip with an excellent flatness can be manufactured if the base material glass plate is heated so that the length of the base material glass plate from a position where melting starts to a position of an inflection point formed at a time of the drawing on the contour of the base material glass plate (i.e., meniscus length) is equal to or longer than two-thirds the width of the base material glass plate.

The example 8 heats the base material glass plate so that the meniscus length is 1.5 times the width of the base material glass plate (base material width). A glass strip manufactured under such conditions shows a favorable flatness of 5 μm against the plate width of 20 mm. In this case, however, it is found that the shape of the glass strip responds to an adjustment of the manufacturing conditions more slowly, and sometimes it is difficult to adjust average values of the width or the thickness of the glass strips through fine adjustment of the pulling-out speed. Based on the results, it is found that when the heating is performed so that the length of the base material glass plate from a position where the melting starts to a position of the inflection point formed at a time of the drawing on the contour of the base material glass plate (i.e., meniscus length) is equal to or shorter than 1.5 times the width of the base material glass plate, a glass strip whose width and thickness are accurately controlled can be manufactured.

Examples 9 to 11

As an example of the present invention, a base material glass plate of 328 mm in width, 5 mm in thickness, and approximately 1.5 m in length is prepared from TEMPAX Float®. The prepared base material glass plate is subjected to heating drawing, and a glass strip is manufactured. As a heating furnace, one with three heaters arranged on two sides of the base material glass plate as shown in FIG. 2, or with heaters having a relatively short heater length as shown in FIG. 7 is employed. Each heater is 256 mm in width. As drawing conditions, the pulling-out speed is set to 7 m/min, the width and thickness after the drawing is set to 25 mm and 0.38 mm. The aspect ratio in cross section is 66.

Figure 11:
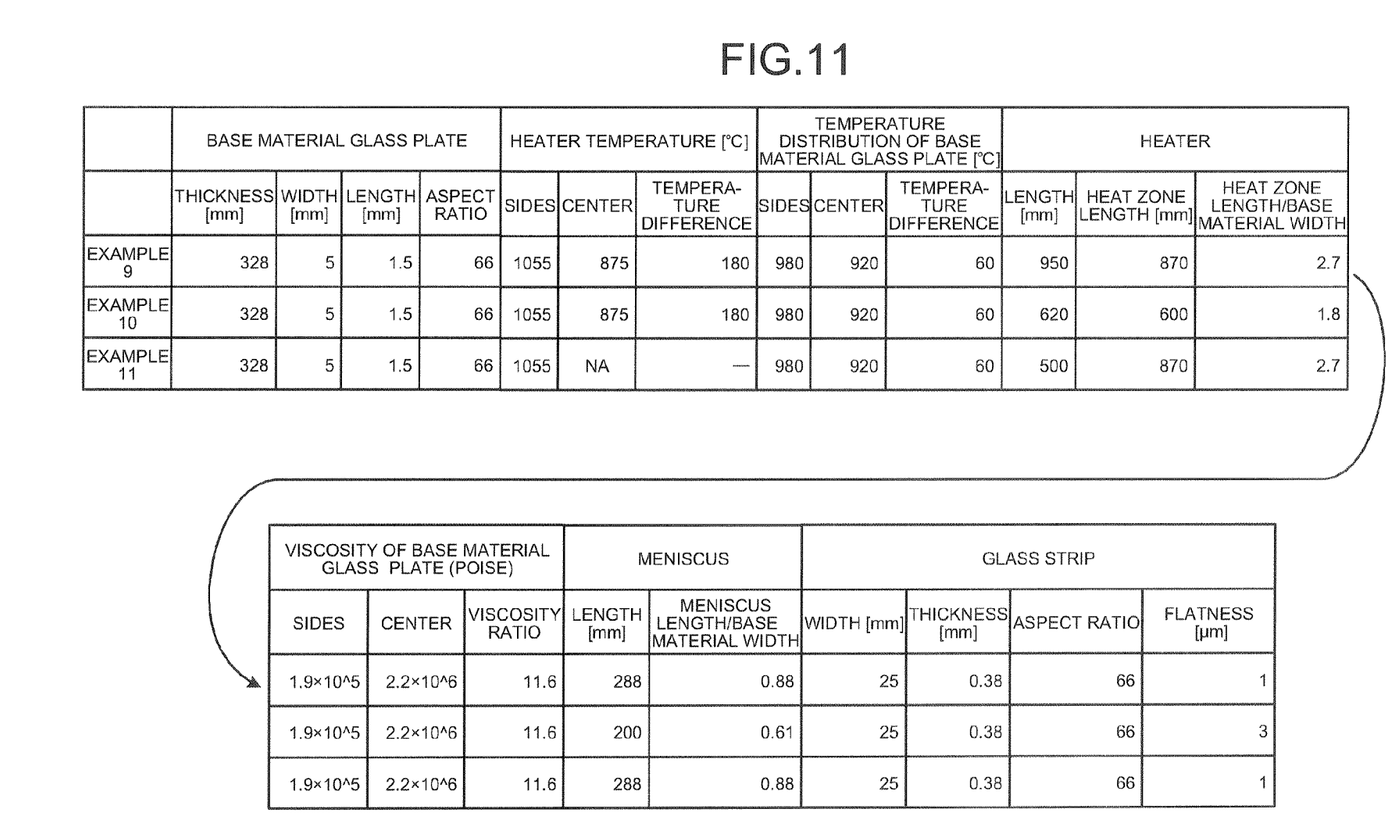
FIG. 11 is a table of examples 9 to 11.

Examples 9 to 11 shown in FIG. 11 will be described below. The example 9 employing the heating furnace of FIG. 2 adjusts the heat zone length by setting the temperature of the central heater to 875° C., and the temperature of the side heaters to 1055° C., and setting an appropriate heater length, and heats the base material glass plate so that the meniscus length is 0.88 time the width of the base material glass plate (base material width). The temperature of the base material glass plate is 920° C. in the central portion, and 980° C. in the side portions, showing a U-shaped temperature distribution with the temperature difference of 60° C. A glass strip manufactured under such conditions has a highly favorable flatness of 1 μm against the plate width of 20 mm.

The example 10, similarly to the example 9, sets the temperature of the central heater to 875° C. and the temperature of the side heaters to 1055° C. in the heating furnace of FIG. 2, while setting the heater length slightly shorter, and the heating is performed so that the meniscus length is 0.61 time the base material width. A glass strip manufactured under such conditions shows a favorable flatness of 3 μm against the plate width of 20 mm, though the value is slightly larger than the value of the example 9. Thus, it is found that when the heating is performed so that the base material glass plate has a U-shaped temperature distribution in the width direction, and the length of the base material glass plate from a position where the melting starts to a position of the inflection point formed at a time of the drawing on the contour of the base material glass plate (i.e., meniscus length) is equal to or longer than two-thirds the width of the base material glass plate, a glass strip with an even more excellent flatness can be manufactured.

The example 11 performs heating with the heating furnace using the heaters with a relatively short heater length as shown in FIG. 7. Through the similar temperature setting as in the example 9, a U-shaped temperature distribution with the temperature difference of 60° C. between the central portion and the side portion of the base material glass plate is obtained. Further, even though the heater length is approximately a half that of the example 9, the heat zone length is similar to that of the example 9, and the meniscus length is 0.88 time the base material width similarly to the example 9. A glass strip manufactured under such conditions shows a highly favorable flatness of 1 μm against the plate width of 20 mm similarly to the example 9. In addition, the use of the heaters with a relatively short heater length results in efficient heating with lower power consumption.

When quartz glass is employed as a material of a glass strip in the present invention, it is possible to deposit a functional film on a surface of the glass strip through thermal CVD, for example, utilizing a high-temperature tolerance thereof. Further, when multicomponent glass is employed as a material of a glass strip, it is possible to deposit a functional film on a surface using a low-temperature process.

Still further, the glass strip of the present invention may be cut off in a polygonal shape, a circular shape, or a disk shape according to the use purpose, and used as a glass substrate. Further, an obtained substrate may be polished before use.

INDUSTRIAL APPLICABILITY

A glass strip manufactured according to the method of manufacturing a glass strip according to the present invention can be developed into a product group utilizing the flatness and surface property thereof. For example, the glass strip is useful as a material for semiconductor devices, spacers for field-effect flat panel displays, and circuit substrates, in particular, is appropriate for substrates of semiconductor devices, spacers used in field-effect flat panel displays, and substrates of small magnetic disks. Further, glass substrates manufactured from glass strips of the present invention are suitable for glass substrates of DNA chips employed in medical analysis or the like. Further, when the glass strips of the present invention are arranged in a planar-shape, the glass strips can be expanded to two-dimensional substrates of any size.

The invention claimed is:

1. A method of manufacturing a glass strip comprising:
   heating and softening a base material glass plate in a heating furnace; and
   drawing the base material glass plate to a desirable thickness to form a glass strip,
   wherein the heating furnace includes a rectangular core tube through which the base material glass plate passes, the core tube having a plurality of side surfaces,
   wherein at least one of the plurality of side surfaces of the core tube includes a plurality of heaters positioned along the outside of the side surface, the plurality of heaters being arranged along a width direction of the base material glass plate, wherein the base material glass plate is heated by adjusting temperatures of the plurality of heaters so that the base material glass plate has a U-shaped temperature distribution in a width direction in a meniscus portion from a position where melting starts to a position of the inflection point formed at the time of drawing on the contour of the base material glass plate, wherein the base material glass plate is heated so that a viscosity ratio of a central portion to a side portion in a highest temperature portion of the base material glass plate in the width direction is larger than one and not larger than 20, wherein the base material glass plate is drawn while an aspect ratio in cross section of the base material glass plate is substantially maintained, and so that the glass strip has a flatness of not more than 10 μm against a width of 20 mm of the glass strip, wherein the glass strip has an aspect ratio in cross section equal to or higher than 50, and wherein the plurality of heaters are arranged in parallel with only a width direction of the base material glass plate.

2. The method of manufacturing a glass strip according to claim 1, wherein a viscosity ratio of the central portion to the side portion of the base material glass plate in the width direction is equal to or larger than 3.4.

* * * * *